Patented July 31, 1928.

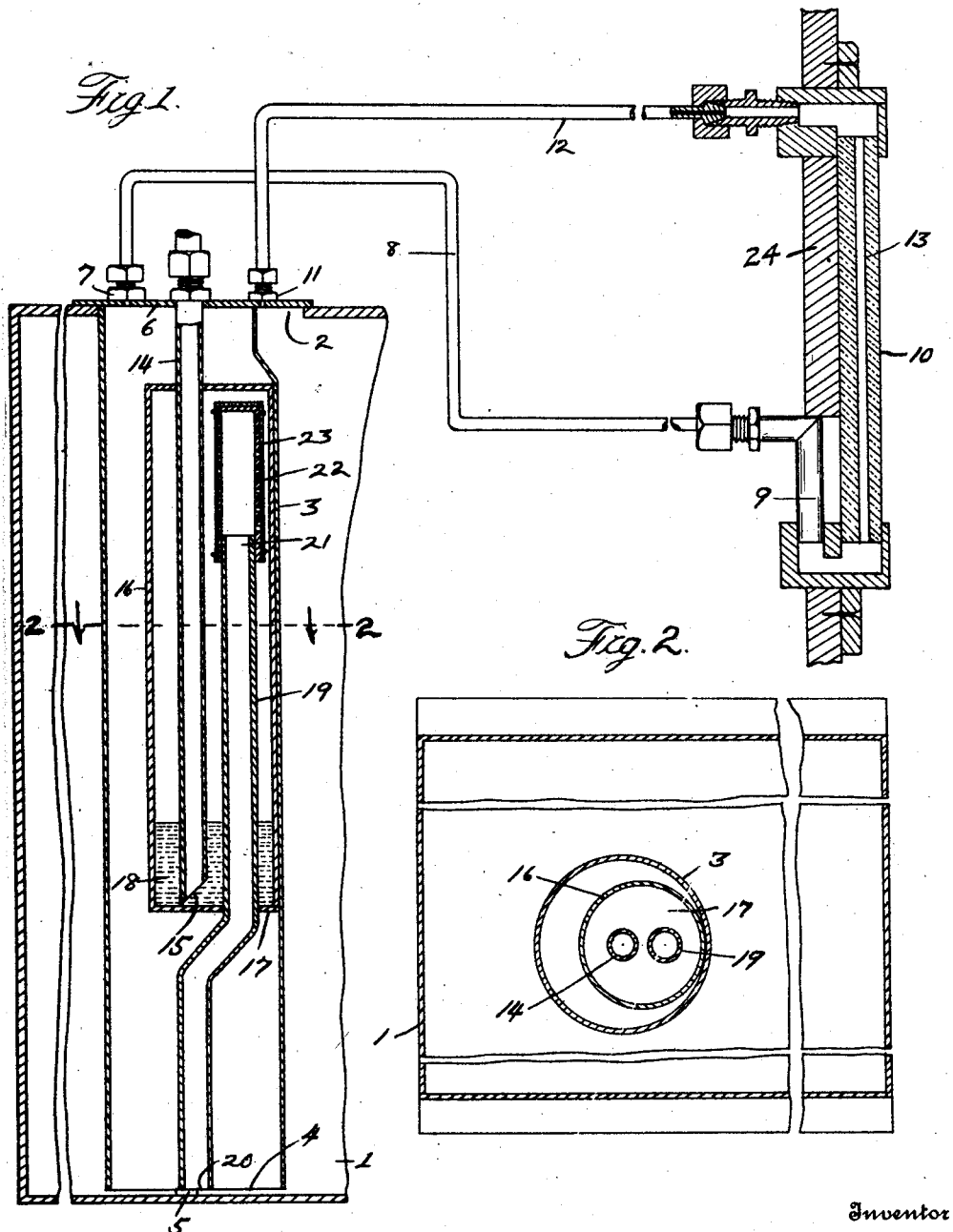

1,679,222

UNITED STATES PATENT OFFICE.

HORACE W. KING, OF ANN ARBOR, MICHIGAN, ASSIGNOR TO KING-SEELEY CORPORATION, OF ANN ARBOR, MICHIGAN, A CORPORATION OF MICHIGAN.

DEPTH-INDICATING DEVICE.

Application filed August 30, 1919, Serial No. 320,799. Renewed February 10, 1922. Serial No. 535,619.

The invention relates to devices for indicating the depth of liquids, and is designed for use especially in devices in which air under pressure is used to force a liquid from a tank. The object of the invention is the provision of a construction which measures the liquid in the tank by indicating upon a suitably graduated indicator gage the resistance offered by the liquid displaced by air under pressure; and further the provision of means for preventing the backward flow of the liquid to the source of compressed air in the event that the latter leaks and is at rest. Other objects of the invention reside in the novel arrangements and combinations of parts as more fully hereinafter set forth.

In the drawings:

Figure 1 is a longitudinal sectional view partly in elevation of a construction embodying my invention;

Figure 2 is a cross section on the line 2—2 of Figure 1.

My invention is designed particularly for use in structures in which a closed tank contains the liquid to be measured and a tube adapted for the passage of air under pressure extends into and communicates with the liquid. The air passing through the tube displaces the liquid therein and then passes up through the liquid and is contained in the tank outside of the tube. The difference in the pressures of the air in the tank outside of the tube and in the tube corresponds to the height of the liquid above the point of communication of the tube therewith, and when these pressures are transmitted to a suitably graduated indicator gage the height or if desired, the volume of liquid may be shown. The source of compressed air, such as a pump, which is connected to the tube may leak, and in the event that this is true, the liquid in the tank is liable to be forced backward into the tube and the connection to the pump, and might even enter the latter. With my construction this is prevented.

1 is a tank, such for instance as a gasoline tank upon an automobile. This tank has an aperture 2 in its top through which the tube 3 extends into the gasoline. The lower end 4 of this tube is open and terminates adjacent to the bottom of the tank 1, suitable means, such as the projections or ears 5 being provided engaging the bottom of the tank to prevent the closing of the lower end 4 of the tube. The space between the lower end 4 of the tube 3 and the bottom of the gasoline tank should be as small as possible and at the same time large enough to permit the free passage of air beneath the tube. 6 is the cap for the tube 3 and engages the top of the tank 1 and seals the opening 3 therein. Suitably secured to the cap 6 is the threaded nipple 7 communicating with the space inside the tube 3 and adapted for connection with the pipe connection 8 leading to the leg 9 of the U-shaped pressure gage 10. 11 is another nipple secured to the cap 6, this nipple communicating with the space in the tank 1 outside the tube 3. 12 is a suitable pipe connection leading from the nipple 11 to the other leg 13 of the gage 10.

To supply the air to the tube 3 to displace the gasoline therein, which also supplies air for pressure in the tank where the gasoline is forced from the tank by air pressure, the inner tube 14 is provided extending substantially axially of the tube 3. The lower end 15 of this inner tube is open while the upper end is secured to the cap 6 and is adapted to be connected to a suitable source of air pressure, such as a pump, (not shown). With the construction, as thus far described, the air is forced through the inner tube 14 into the outer tube 3 and displaces the gasoline therein. The U-gage 10 having its legs communicating with the tube 3 and the tank 1 outside the tube 3, indicates the difference of air pressures in the tube and in the tank outside the tube, which pressure differential corresponds to the hydrostatic pressure of the gasoline in the tank, and as a consequence, the gage 10, when suitably graduated, correctly shows the height or the amount of the gasoline in the tank.

The gage 10 is preferably located on the dash 24 of an automobile in a position to be easily seen by the driver. The device operates equally satisfactorily regardless of the relative position or elevation of the gasoline tank or gage.

For the purpose of preventing the backward flow of the gasoline up through the inner tube 14, which air under pressure is no longer being forced therethrough, and in the event that the source of the compressed air, such as a pump, leaks, the following construction is provided: 16 is a closed receptacle within the outer tube 3 and secured thereto, as by being soldered or welded to the side wall thereof. This receptacle has its bottom 17 terminating adjacent to the lower end 15 of the inner tube 14 and contains a liquid 18, which is heavier than the gasoline. In the present instance this heavier liquid is mercury. 19 is a third tube having its upper end a substantial height above the heavier liquid 18 and its lower end terminating near the bottom of the tank within the tube 3. This tube 19 extends through the bottom 17 of the receptacle and has its lower end 20 open and its upper end 21 communicating with the space within the receptacle 16.

For the purpose of preventing the escape of the heavier liquid 18 into the tube 19 the upper end of the latter tube is obstructed, this obstruction comprising an apertured tube 22 engaging the upper end 21 and surrounded by suitable material 23, such as kid, which permits of the passage of air therethrough. The tube 19 is also of larger diameter than the tube 14.

In operation, when the air is forced through the tube 14 it passes out through the lower end thereof, out through the heavier liquid 18 and then passes through the kid 23 and apertured tube 22 into the third tube 19 and escapes from the lower end 20 thereof into the outer tube 3 to displace the gasoline therein. As before mentioned, the gage 10 indicates the difference of pressure in the outer tube 3 and the tank outside the tube, whereby the depth or amount of gasoline in the tank will be shown. In the event that the air pump leaks and is not running, the gasoline will have a tendency to flow backward up through the third tube 19 into the receptacle 16 and then through the tube 14 to the pump, due to the pressure of the air in the tank 1 outside the tube 3. This is prevented by means of the heavier liquid 18 closing the lower end of the inner tube 14, since this heavier liquid can not be forced into the tube 14 to a distance above the cap 6 of tube 3, by such pressures as are maintained in automobile tanks.

What I claim as my invention is:

1. In a depth indicating device for liquids, the combination with a closed tank containing a liquid, of a tube extending into the liquid and communicating therewith at the full depth to be measured, a second tube adapted for the passage of air under pressure and extending into said first-mentioned tube, means communicating with the interior of said first mentioned tube and containing a liquid at the lower end of said second tube for closing the same, and means connected to said first mentioned tube and said tank above the level of the liquid contained therein for indicating the differences in air pressures in said first mentioned tube and in said tank above the level of the liquid contained therein.

2. In a depth indicating device for liquids, the combination with a closed tank containing a liquid, of a tube extending into the liquid and communicating therewith at the full depth to be measured, a second tube adapted for the passage of air under pressure and extending into said first-mentioned tube, a receptacle communicating with said first-mentioned tube and containing a liquid heavier than the liquid to be measured, said heavier liquid surrounding the lower end of said second tube, means for preventing the escape of said heavier liquid from said receptacle into said first mentioned tube, means for indicating the differences in air pressures in said first mentioned tube and in said tank above the level of the liquid contained therein, and pressure transmitting means between said indicating means and first mentioned tube and tank above the level of the liquid contained therein.

3. In a depth indicating device for liquids, the combination with a tank containing a liquid, of a tube extending into the liquid and communicating therewith near the bottom of said tank, a closed receptacle in said first-mentioned tube containing a liquid heavier than the liquid to be measured, a second tube adapted for the passage of air under pressure and extending into said first-mentioned tube and closed receptacle and terminating in said heavier liquid, a third tube having one end in communication with the space enclosed by said receptacle and the other end terminating inside said first-mentioned tube and near the bottom of said tank, and a pressure gage communicating with said first-mentioned tube.

4. In a depth indicating device for liquids, the combination with a closed tank containing a liquid, of a substantially vertical tube extending into the liquid and communicating therewith near the bottom of said tank, a closed receptacle in said tube containing a liquid heavier than the liquid to be measured, a second substantially vertical tube adapted for the passage of air under pressure and extending into said first-mentioned tube and receptacle and terminating near the bottom of said receptacle, a third substantially vertical tube having its upper end communicating with the interior of said closed receptacle above the liquid therein and its lower open end terminating inside said first-mentioned tube near the bottom of said tank, means at the upper end of said third tube for preventing the passage of the heavier liquid thereinto, a pressure gage, and pressure transmitting means between said pressure gage and first mentioned tube and pressure gage and tank above the level of the liquid contained therein.

5. In a depth indicating device for liquids, the combination with a tube having a closed upper end and extending into and communicating below its upper end with the liquid being measured, and a pressure indicator connected with said tube, of means extending within said tube for conducting air thereinto to displace the liquid therein down to its point of communication with the liquid, said air conducting means including means within said tube for preventing the backward flow of the liquid being measured through said air conducting means when the air is no longer being conducted therethrough.

6. In a depth indicating device for liquids, the combination with a tank containing a liquid, of means forming a chamber open at its lower end and communicating with the liquid at the full depth to be measured, a receptacle containing a liquid heavier than the liquid to be measured and communicating with said chamber, a tube extending into said tank and receptacle and having its lower end opening into the heavier liquid, said tube being adapted for the passage of air under pressure, and means closing the communication between said receptacle and chamber to the passage of the heavier liquid and permitting the passage of the air under pressure.

In testimony whereof I affix my signature.

HORACE W. KING.